Feb. 28, 1950 M. R. PRICE Re. 23,201

SCREW DRIVER

Original Filed Jan. 12, 1939

INVENTOR.

BY MANLEY R. PRICE

Geo. M. Soule

ATTORNEY.

Reissued Feb. 28, 1950

Re. 23,201

UNITED STATES PATENT OFFICE 23,201

SCREW DRIVER

Manley R. Price, Lakewood, Ohio

Original No. 2,235,235, dated March 18, 1941, Serial No. 250,599, January 12, 1939. Application for reissue October 10, 1949, Serial No. 120,581

5 Claims. (Cl. 145—50)

Matter enclosed in heavy brackets [ ] appears in the original patent but forms no part of this reissue specification; matter printed in italics indicates the additions made by reissue

This invention relates to a tool device for applying fasteners, particularly screws, and specifically is concerned with an improvement in tools for driving such fastening members in locations which are already marked on the work, as by depressions or sockets.

The invention will be described principally as adapted for applying screws for holding perforated acoustical tile to a suitable backing, for instance, as illustrated in my prior application, Serial No. 203,046, filed April 20, 1938, now Patent No. 2,160,794 in which are shown, but not claimed, portions of the tool hereof.

An object is to provide an improvement in tools for purposes such as mentioned above.

A specific object is to provide a convenient means for applying fastening members, such as screws, to secure one part to another so that the force with which the fastener is driven into final position is limited, to the end that where a plurality of fasteners are to be applied, as at the corners of a slab or tile, all the fasteners will hold the slab or tile with the same force.

Another object is to provide a simple means for aligning a fastener with the axis of a tool part such as a screw driver or nail set so that the point of the fastener will remain centered on such tool axis during starting of the driving operation on the fastener.

A further object is to provide a simple device for locating a fastener-driving tool and the fastener with reference to a depression or socket, or a particular one of a plurality thereof, in the work.

Other objects and features of the invention will become apparent from the following description relating to the accompanying drawing showing the preferred forms. The essential characteristics are summarized in the claims.

Figure 1:
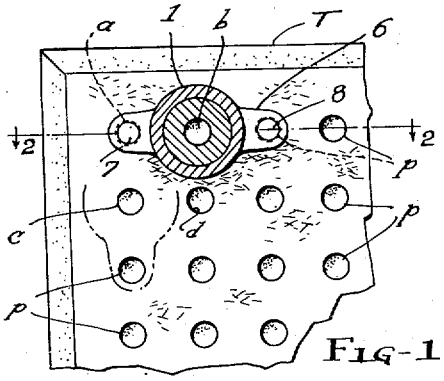
Figure 3:
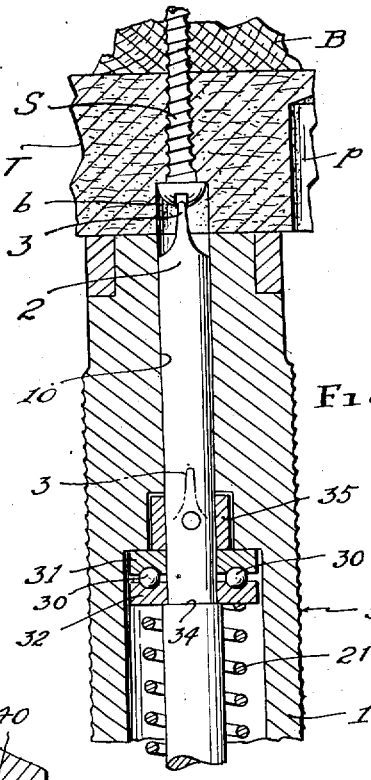
Figure 2:
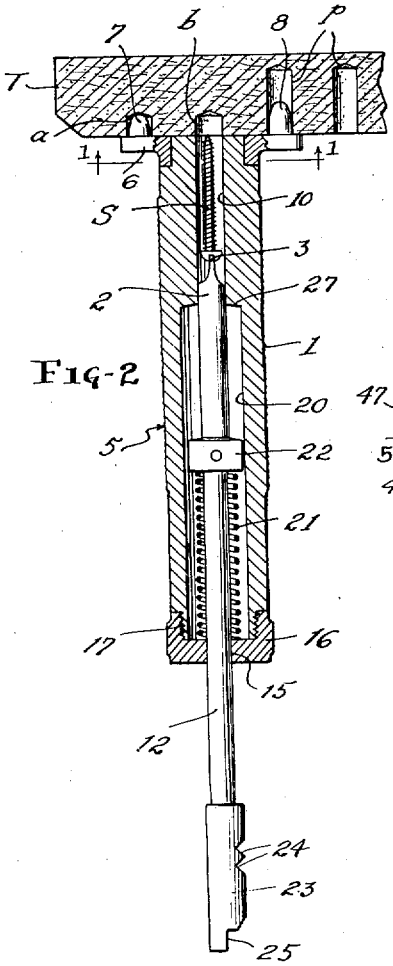
Figure 4:
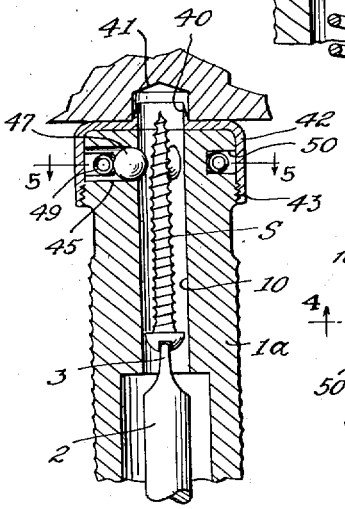
Figure 5:
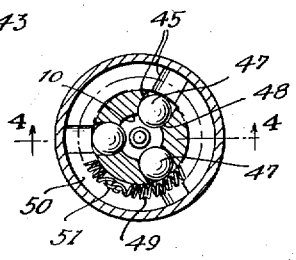

Referring to the drawing, Fig. 1 is a fragmentary plan view of a corner portion of a perforated acoustical tile, said view showing, in transverse section, an end portion of the tool device hereof in fastener-locating position. Fig. 2 is a central longitudinal sectional view of the tool device in one form, the view further showing the relationship of the device to the portion of the tile shown in Fig. 1. Fig. 3 is an enlarged fragmentary view of the tool device, fastener, and tile, when the fastener has been driven into final position, also a modification of part of the tool. Fig. 4 is a fragmentary view similar to Fig. 2 showing a further modified construction, particularly of a fastener-centering means and of a tool device locating means. Fig. 5 is a transverse sectional view taken substantially along the line 5—5 on Fig. 4.

Referring to Fig. 1, the tile T, a corner portion of which is shown, may be formed, for instance, of matted fibers as in the well known Acousti-Celotex tile. Such tile has a multiplicity of sound receiving perforations p distributed over its exposed face, including a small group such as specifically indicated at a, b, c, and d close to the corner and which are shallower than the others. The relationship in depth of the perforations is illustrated in Fig. 2.

The tool device, as shown in Figs. 1 to 3, comprises a body member 1 adapted conveniently to be held in the hand; the body being provided centrally of it with a fastener-driving part 2 (hereinafter referred to for convenience as the tool) which may have a screw driver end 3 for engagement with an ordinary wood screw such as indicated at S, or a helical nail (drive screw) which is to be driven through the tile and into a suitable backing for the tile such as indicated in Fig. 3 at B. The body may be non-circular for facilitating gripping of it in the hand, or knurled as suggested at 5.

At the outer end of the body are a pair of arms 6 which support tool-locating pins 7 and 8 parallel to the axis of the tool. One can be shorter than the other (pin 7) and adapted to engage any one of the perforations a, b or c, and the other (pin 8) one of the perforations p, as in Fig. 2, to locate the axis of the tool directly over one of the shallow perforations b, c, or d. The longer pin 8 can be engaged with four different ones of the perforations p, and the body 1 then turned about the pin 8 as a pivot until the pin 7 drops into a, b, or c; whereupon the tool becomes properly aligned with one of the shallow perforations. Two of the four proper positions of the arms 6 are indicated, one by broken lines. Wider spacing of the pins from the tool axis could be used to align the tool with the perforation d only, if desired.

The tool 2 is supported slidably and rotatably in the body 1 as by easy fit in a bore 10 at one end of the body and similar fitting of a shank portion 12 in a central bore 15 of a cap piece 16. The cap piece may be threaded onto the body as at 17. Located in a counter-bore 20 of the body is a coil spring 21 surrounding the shank of the tool and bearing at one end on the cap piece 16 and at the other against an enlarged abutment element or shoulder 22 fastened to the tool 2 against axial movement thereon. The spring normally forces the tool end 3 toward the bore 10 in a direction tending to drive the fastener into the work. The outer end of the shank 12 is suitably formed as at 23 for engagement with a driving member or mechanism such, for instance, as the chuck of the well known "Yankee" type screw driver. The detent notches 24 and driving shoulder 25 are adapted to cooperate with such chuck. The specific nature of the shank end is unimportant, since any type of driving means can be used to operate the tool 2. In the form shown, compression of the spring limits the outward or retracting movement of the tool in the body 1.

From the above, it will be seen that with the tool 2 withdrawn to the position shown in Fig. 2, the fastener, such as a screw S may be dropped in the outer end of the bore 10 and then, upon rotation of the tool 2 and advancement of it toward the bore 10, the end 3 will become engaged with the slot in the head of the screw to enable the screw to be turned and forced endwise to drive the screw into the work. When the screw has advanced so that its head is seated in the bottom of the perforation b as shown in Fig. 3, then the abutment element 22 engages the inner end 27 of the counter-bore 20 and prevents further driving of the screw, thus limiting the fastening force of it. *At this point the screw has been advanced out of driving engagement with the screw driver.* This same limiting will occur on the remaining three corners of the tile so that all four corners are attached with the same force. The actual location of the limiting stop depends upon the position at which the screw head is to be seated in or against the work. The stop can be made adjustable in any appropriate manner (not shown). A threaded collar on the outer end of the shank 12 adjacent the formation 23 could serve as an adjustable stop by engagement with the cap 16.

*From inspection of Fig. 3 it will be seen that at its innermost position the screw driver tip 3 of the tool 2 projects beyond the end of the bore and into the hole in the work or tile T. The extent to which the driving tip 3 projects beyond the upper face of the tool body, which is shown as in contact with the face of the tile, has a critical relation to the depth of a perforation or socket such as at b. The thickness or height of the screw head, plus the distance to which the tip 3 projects beyond the surface of the work, is such that when the screw head reaches the bottom of the perforation, the tip 3 is so nearly (relatively) withdrawn from the screw slot, by reason of the axial advance of the screw, that it will not drive the screw any farther.*

Preferably, the abutment element 22 comprises an anti-friction thrust bearing, such for instance, as shown in Fig. 3, wherein a series of balls 30 are retained in races of bearing ring members 31 and 32 which are held in position on the tool 2 as by engagement of one of the bearing members with a shoulder 34, and of the other with a collar 35 fastened as by an appropriate pin to the tool 2. Sufficient clearance is provided between the plane of the shoulder 34 and the near end of the collar 35 adjacent the bearing ring 31 so that the bearing can always turn freely. With such anti-friction bearing limiting the outward movement of the tool 2, there will be no wear on the abutment stop, such as 27, provided to limit the advancement of the tool end, and no appreciable resistance to free rotation at any time.

[It will be apparent that a device constructed as described could be used to drive any sort of nail and limit the fastening force thereof. The end portion of the tool would ordinarily be modified in accordance with the fastener with which to be used.]

*The attainment of the object of driving the fasteners, or screws, into the tile or slabs with the same force results from my unique arrangement, whereby when the axial movement of the screw driver is arrested by the stop, the screw is literally driven off from the driving tip at the instant when the screw head becomes seated.*

*The mechanical arrangement of the rotatable axially movable screw driver element extending through and rotating in a bore slightly larger than the screw head, and the element being of a length sufficient to project the tip a predetermined distance outside of the bore and beyond the surface of the work, permit an operation unique in such devices. As above indicated, first the screw is dropped into the bore and has its slot engaged by the tip 3. This occurs as the screw driver tool or shaft is rotated in contact with the screw head. In practice the shaft or shank 12 may be spinning when the screw is dropped into the bore, or at the beginning of such turning, the tip engages and "picks up" the screw starting its rotation. Axial movement now may cause the driving of the screw until its head is seated in the bottom of the hole in the work, which is in alignment with the bore, the alignment of the screw carrying bore and the hole having been effected by placing the members 7 and 8 into adjacent holes or perforations a and p.*

*Such a screw head being ordinarily a round head, as shown, the tip 3 twists itself free from its last slight engagement without distortion of the screw head and yet has sufficient last instant engagement that the desired firm seating of the screw is obtained.*

*The precise instant of release is intended to be illustrated in Fig. 3, where even a slight partial additional turn of the screw S will axially advance it beyond and out of driving engagement, and the continued turning of the tip and screw driver tool will no longer turn the screw but will rotate ineffectively with relation to the screw head until withdrawn.*

*In practice there is some minute distortion of the edges of the screw slot near the center of the head, which is of no consequence and does not so disturb or distort the screw slot that the screw cannot be later removed with an ordinary hand screw driver.*

*From the foregoing, the importance of the relationship of the distance which the driving tip may project beyond the bore with relation to the hole or perforation in the work, and which may be adjusted and precisely determined by the stop, and whereby a screw in the bore may be engaged by the slotted head and be driven effectively out beyond the bore and be seated with the desired force or tension, constitutes a unique and most effective arrangement for accomplishing the objects stated.*

*The positioning of the body of the tool, aligning its bore with a socket or perforation to receive the screw, while effectively limiting the axial movement of the screw driver without defacing the surface against which the tool body rests, are of importance in the rapid and efficient application of screws to perforated acoustical tile.*

*Thus, the essence of my invention comprises the means for locating the tool to align the screw receiving bore with an opening and the provision of the stop on the screw driving element to accurately limit the axial advance of the screw driver with relation to the face of the work.*

Figs. 4 and 5 illustrate, particularly, an arrangement for centralizing the fasteners, as when the heads thereof are large in proportion to the shanks, or whenever required by the nature of the work. As shown, a modified locating member 40 is shown on the end of the body 1a for engagement with a socket or depression 41 in the member to be fastened, which socket receives the head of the fastener in the final position of it. The member 40 may comprise a conical extension of a sleeve 42 secured to the head as by threads 43.

Radially positioned bores 45 spaced 120° about the axis of the tool may support spring-pressed centering members for the fastener S, such as steel balls 47 arranged relative to the fastener-receiving bore 10 as shown in Fig. 5. The balls can be limited in their inward movement as by constricted portions of the radial bores as at 48. Suitable yielding means for moving the centering elements 47 into operating position may comprise a single coil spring 49 in a circular recess 50 intercepting the bores 45 in the plane of the centers of the balls 47; the ends of the coil spring being detachably secured together as at 51.

It will be apparent that when placing the fastener in the tool device, the head of the fastener pushes the balls 47 outwardly, and that when the fastener is then moved or dropped into engagement with the working end of the tool 2, the shank will be held centered; and also that, as the tool is advanced, the head of the screw again pushes the balls back out of the way of the head to allow the latter to pass out of the bore toward the work.

I claim:

1. A device for driving a *screw* headed fastener into one of a number of prearranged spaced sockets in the work, said device comprising a body adapted to be grasped by and supported in one hand of an operator, said body having a *screw driver* tool slidably arranged *therein, and* [in it, a bore in] the body *having a bore* adapted to receive an elongated fastener substantially entirely therewithin and to guide the *screw* head into cooperative engagement with *the screw driver tip* [one] end of the tool, and short pins on the body parallel to the tool axis and diminishing in cross section toward their extremities, *and each having a maximum transverse diameter substantially equal to or greater than said bore,* said pins being arranged for selective engagement with a plurality of said sockets in the work in a manner to align *the bore and* the tool with another one of such sockets.

2. A device of the class described *for driving screws into spaced cylindrical sockets in acoustical tile and* comprising a body adapted to be held in the hand and having a tool slidably arranged in it, said body having a surface of considerable extent adapted to abut the work, said surface extending in a direction substantially perpendicular to the axis of the tool, and means *comprising spaced rigid locating pins* projecting beyond said surface to [engage] *fit two of said spaced sockets in* the work in a manner to locate the tool in proper position relative to the work, [a bore in] the body *having a cylindrical bore the diameter of which is substantially the same as that of said sockets and* adapted to receive a fastener for cooperative engagement with one end of the tool, and *said tool being arranged to rotatably project through said bore, and* abutment means on the body and tool to limit the forward movement of the tool relative to the body, whereby, when said surface is held in abutment with the work at each position at which fastening is desired, each fastener will penetrate the work to the same depth irrespective of the driving force applied to the tool.

*3. A device for driving a screw-headed fastener into one of a number of prearranged spaced sockets in the work, said device comprising a body adapted to be grasped by and supported in one hand of an operator, said body having a tool slidably and rotatably arranged in it, the body having a cylindrical bore adapted to receive an elongated and headed screw fastener substantially entirely therewithin and to guide the head into cooperative driving and turning engagement with one end of the tool, and short pins on the body parallel to the tool axis and diminishing in cross section toward their extremities, said pins being arranged for selective engagement with a plurality of said sockets in the work in a manner to align the tool with the bore and fastener therein with another one of such sockets, and cooperating relatively rotatable shoulders on the body and tool coacting to arrest the axial driving movement of the tool while continued turning advances the screw fastener out of driving engagement with the tool, said bore being of a diameter substantially the same as that of the sockets engaged by the pins.*

*4. A device for driving an elongated headed fastener in the form of a slotted-head screw into one of a number of prearranged spaced sockets in the work, said device comprising a body adapted to be grasped by and supported in one hand of an operator, said body having a tool slidably and rotatably arranged in it, and having a screw driver tip, the body having a bore adapted to receive said elongated fastener substantially entirely therewithin and to guide the head into cooperative engagement with the screw driver tip of the tool, and short pins on the body parallel to the tool axis and diminishing in cross section toward their extremities, said pins being of a maximum diameter substantially equal to said bore and spaced for selective engagement with a plurality of said sockets in the work in a manner to align the tool with another one of such sockets, said body having a shoulder and said tool having a stop member adjustably fixed thereon for rotatably engaging the shoulder and acting to arrest axial movement of the tool while permitting continued rotation thereof.*

*5. A device for driving a slot-head screw into one of a number of prearranged spaced sockets of uniform diameter in the work, comprising a body adapted to be held in the hand and having a tool in the form of a screw driver element slidably and rotatably arranged in it and having a driving tip, said body having a surface of considerable extent adapted to abut the work, said surface extending in a direction substantially perpendicular to the axis of the screw driver element tool, and spaced projections extending from said surface to engage the sockets in the work in a manner to locate the tool in proper position relative to the work, said body having a bore of a diameter substantially the same as that of the sockets in the work adapted to receive a screw-fastener for cooperative engagement with the tip of the screw driver element and adjustable abutment means on the body and screw driver element, said means having coacting relatively rotatable surfaces to limit the forward movement of said element relative to the body, said element being of such a length that its driving tip may project into a socket to a predetermined*

*depth according to the position of the abutment, which acts to limit the outward movement while permitting the screw to advance until disengaged while the tool is turning, when said surface is held in abutment with the work at each position at which fastening is desired, and whereby each screw will penetrate the work to the same depth irrespective of the driving force applied to the tool.*

MANLEY R. PRICE.

REFERENCES CITED

The following references are of record in the patented file of this patent or the original patent:

UNITED STATES PATENTS

| Number | Name | Date |
|---|---|---|
| 568,932 | Wilcox | Oct. 6, 1896 |
| 734,204 | Voss | July 21, 1903 |
| 1,023,021 | Lagarde et al. | Apr. 9, 1912 |
| 1,079,650 | Jordan | Nov. 25, 1913 |
| 1,222,129 | Polkowski | Apr. 10, 1917 |
| 1,450,203 | De Brown | Apr. 3, 1923 |
| 1,457,457 | Peyer | June 5, 1923 |
| 1,515,025 | Foy | Nov. 11, 1924 |
| 1,539,782 | Stansell | May 26, 1925 |
| 1,597,176 | Bresser | Aug. 24, 1926 |
| 1,645,753 | Hanson | Oct. 18, 1927 |
| 1,699,870 | Black et al. | Jan. 22, 1929 |
| 1,758,235 | Nash | May 13, 1930 |
| 1,769,510 | Herman | July 1, 1930 |
| 1,791,771 | Velepec | Feb. 10, 1931 |
| 1,831,813 | Levedahl | Nov. 17, 1931 |
| 1,984,117 | Davis | Dec. 11, 1934 |

FOREIGN PATENTS

| Number | Country | Date |
|---|---|---|
| 448,867 | France | Dec. 7, 1912 |
| 456,035 | Germany | Apr. 13, 1928 |
| 404,557 | Great Britain | Jan. 18, 1934 |